United States Patent [19]

Sudo et al.

[11] Patent Number: 5,134,110
[45] Date of Patent: Jul. 28, 1992

[54] METHOD FOR PREPARING LIQUID CHROMATOGRAPHIC PACKING MATERIAL

[75] Inventors: Yoshihisa Sudo, Koshigaya; Yasuyo Takahata, Tokyo, both of Japan

[73] Assignee: Chemical Inspection & Testing Institute, Japan, Tokyo, Japan

[21] Appl. No.: 658,661

[22] Filed: Feb. 21, 1991

[30] Foreign Application Priority Data

Feb. 22, 1990 [JP] Japan ................................... 2-43708

[51] Int. Cl.$^5$ ............................................. B01J 31/02
[52] U.S. Cl. ................................... 502/401; 502/407; 502/158
[58] Field of Search ........................ 502/407, 158, 401

[56] References Cited

U.S. PATENT DOCUMENTS

| 4,376,641 | 3/1983 | Nestrick et al. | 55/67 |
| 4,539,399 | 9/1985 | Armstrong | 536/103 |

FOREIGN PATENT DOCUMENTS 0050167 10/1980 European Pat. Off. .
924812 5/1963 United Kingdom .

OTHER PUBLICATIONS

Marshall et al., *Liquid Chrom. Ab.*, #270, p. 59 (1986).

*Primary Examiner*—Patrick P. Garvin
*Assistant Examiner*—Brent M. Peebles
*Attorney, Agent, or Firm*—Birch, Stewart, Kolasch & Birch

[57] ABSTRACT

Packing materials for use in liquid chromatographs are prepared by reacting silica gel or porous glass having silanol groups on the surface thereof with a chemical modifier to chemically attach the chemical modifier to silanol groups on the silica gel or porous glass, and reacting the chemically modified silica gel or porous glass with an end-capping agent in gas phase at 250°-500° C. to chemically attach the end-capping agent to the residual silanol groups on the silica gel or porous glass.

15 Claims, 3 Drawing Sheets

FIG. 1
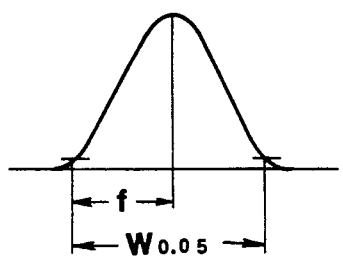
FIG. 2
(EXAMPLE 4)
FIG. 3
(EXAMPLE 11)
FIG. 4
(EXAMPLE 16)
FIG. 5
(EXAMPLE 29)
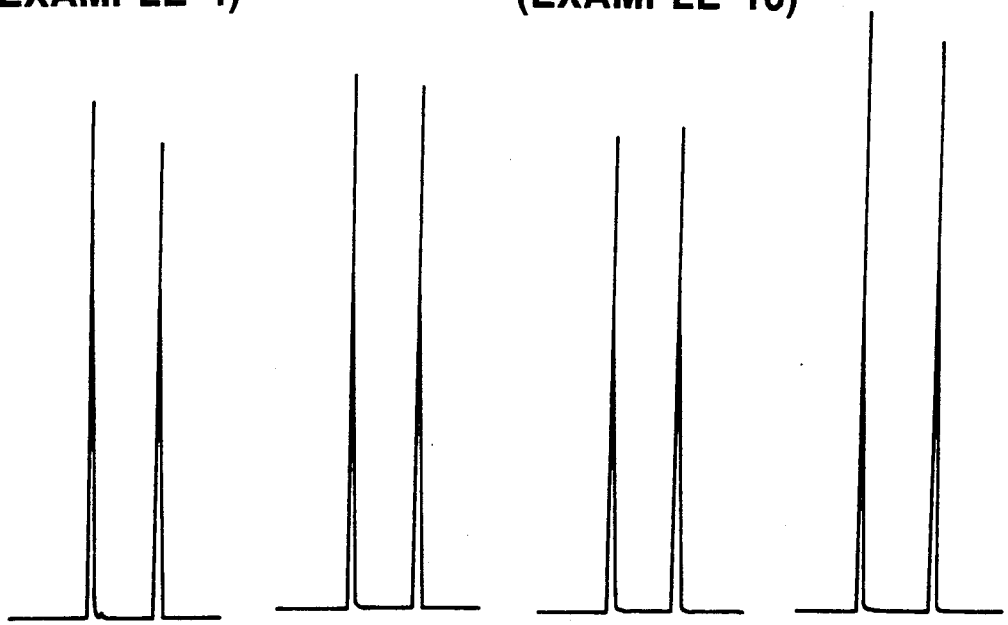

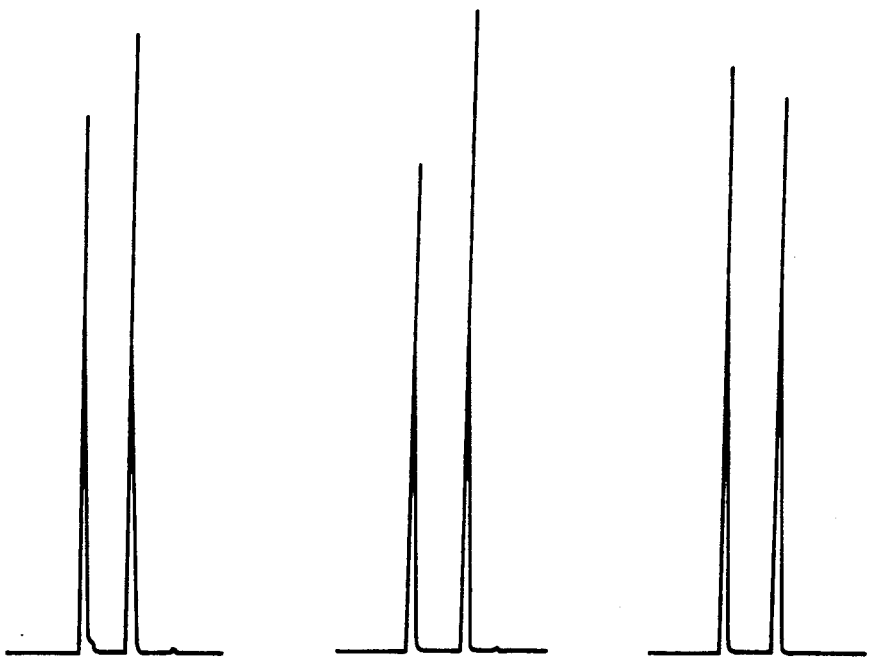
FIG. 6 (EXAMPLE 36) FIG. 7 (EXAMPLE 37) FIG. 8 (EXAMPLE 38)

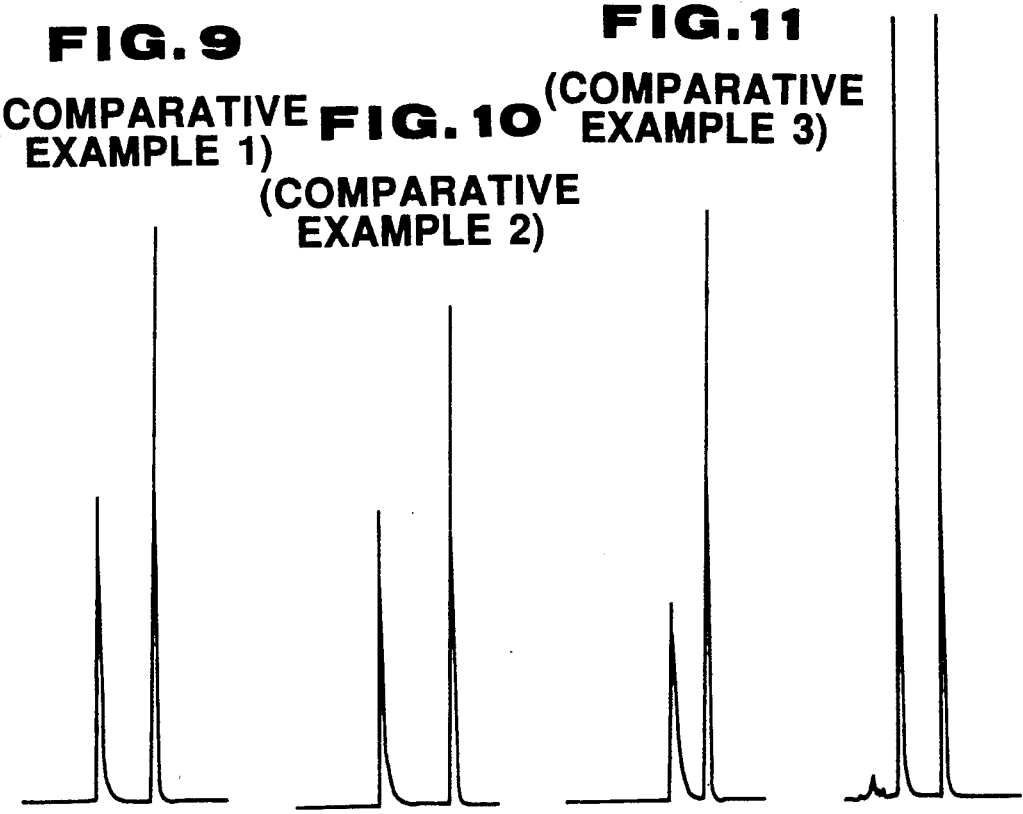

METHOD FOR PREPARING LIQUID CHROMATOGRAPHIC PACKING MATERIAL

This invention relates to a method for preparing a packing material in the form of silica gel or porous glass having a chemical modifier incorporated therein for use in a liquid chromatograph, and more particularly, to a method for preparing an inert packing material by a novel end-capping technique.

BACKGROUND OF THE INVENTION

In high performance liquid chromatography, the commonly used packing materials are modified silica gels. Silica gel is generally modified by silylating it with silanes having various chemically modifying groups such that the chemically modifying groups are chemically attached to silanol groups on the surface of silica gel. Most widely used among others are octadecylated silica gel (ODS) packing materials which have octadecyl groups incorporated on the silica gel surface using octadecylchlorosilanes. Other known chemically modifying groups include octyl, butyl, methyl, cyanopropyl, and phenyl groups.

On actual use of the chemically modified silica gel packing materials in high speed liquid chromatography, problems arise with superfluous silanol groups remaining on the silica gel substrate. More particularly, polar solutes, especially basic solutes strongly interact with the residual silanol groups. This interaction prevents or retards elution of the basic solutes and causes peak tailing, so that reproducible chromatograms may not be obtained.

In order to reduce the influence of residual unreacted silanol groups, it was proposed to end cap the silica gel having chemically modifying groups attached thereto by subjecting the silica gel to silylation again with trimethylchlorosilane or the like for chemically attaching short chain alkyl groups to the residual silanol groups. The conventional end-capping technique is to subject the once modified silica gel to secondary silylation in a solvent such as toluene. The end-capped silica gel, however, retains more or less silanol groups unchanged, causing peak tailing.

SUMMARY OF THE INVENTION

An object of the present invention is to provide a method for preparing a packing material for use in a liquid chromatograph using a novel end-capping technique such that the influence of residual silanol groups is reduced.

Investigating the end-capping step, the inventors have found that by carrying out the reaction of silica gel or porous glass with an end-capping agent in gas phase at temperatures of 250° C. or higher rather than in solvents as in the prior art, quite unexpectedly, there can be synthesized a packing material having least influence of residual silanol groups. The present invention is predicated on this finding.

According to the present invention, there is provided a method for preparing a packing material for use in a liquid chromatograph, comprising:

a first step of reacting silica gel or porous glass having silanol groups on the surface thereof with a chemical modifier to chemically attach the chemical modifier to silanol groups on the silica gel or porous glass, and a second step of reacting the chemically modified silica gel or porous glass with an end-capping agent in gas phase at a temperature of 250° C. or higher to chemically attach the end-capping agent to the residual silanol groups on the silica gel or porous glass.

BRIEF DESCRIPTION OF THE DRAWINGS

The above and other objects, features, and advantages of the present invention will be better understood from the following description taken in conjunction with the accompanying drawings, in which:

FIG. 1 illustrates how to calculate the tailing factor.

FIGS. 2 to 12 are chromatograms resulting from analysis of a pyridine/phenol sample through liquid chromatographs with the packing materials of Examples 4, 11, 16, 29, 36, 37, and 38 and Comparative Examples 1, 2, 3, and 4, respectively.

DESCRIPTION OF THE PREFERRED EMBODIMENTS

In the first step of the method according to the invention, silica gel or porous glass having silanol groups on the surface thereof is reacted with a chemical modifier to chemically attach the chemical modifier to some of the silanol groups on the silica gel or porous glass.

The silica gel used in the first step is not particularly limited in shape and nature although silica gel particulates having a particle size of 1 to 1,000 $\mu$m, especially 2 to 50 $\mu$m, a pore diameter of 0 to 10,000 Å, especially 60 to 1,000 Å, and a specific surface area of 1 to 1,000 $m^2/g$, especially 10 to 600 $m^2/g$ as measured by the BET method are preferred. Silica gel having a pore diameter of 0 Å which is substantially non-porous silica gel is acceptable.

Also, the porous glass may be selected from conventional ones which are used as packing materials in the prior art liquid chromatography. Preferred are porous glass particulates having a particle size of 1 to 1,000 $\mu$m, especially 2 to 50 $\mu$m, a pore diameter of 0 to 10,000 Å, especially 60 to 1,000 Å, and a specific surface area of 1 to 1,000 $m^2/g$, especially 10 to 600 $m^2/g$ as measured by the BET method. The porous glass is preferably comprised of 80 to 99% by weight of $SiO_2$ with the balance of $Na_2O$, $B_2O_3$ or $Al_2O_3$ or a mixture of two or three of them.

The chemical modifiers used herein include chlorosilanes and alkoxysilanes both having one, two or three chemically modifying groups selected from the group consisting of an alkyl group having 1 to 50 carbon atoms, preferably 1 to 18 carbon atoms, such as octadecyl, octyl, and n-butyl groups, an aryl group having 6 to 50 carbon atoms, preferably 6 to 16 carbon atoms, such as a phenyl group, and a substituted alkyl group in which one or more cyano groups, hydroxyl groups, carboxyl groups, acid amide groups, imide groups, sulfon groups, amino groups, glyceroyl groups or groups capable of converting into such groups through hydrolysis are substituted for one or more hydrogen atoms on an alkyl group having 1 to 50 carbon atoms, preferably 1 to 18 carbon atoms, such as a cyanopropyl group, as well as cyclosiloxanes and polysiloxanes having two or more, preferably 6 to 100 chemically modifying groups as mentioned above. The alkoxy groups of the alkoxysilanes are preferably lower alkoxy groups having 1 to 3 carbon atoms, such as a methoxy group. Preferred cyclosiloxanes are those in which 3 to 50 silicon atoms form a ring with an oxygen atom. Preferred polysiloxanes have 2 to 50 silicon atoms. Preferred, non-limiting examples of the chemical modifier are listed in Table 1.

TABLE 1

| Chemically modifying group | Chemical modifiers |
| --- | --- |
| Octadecyl group | dimethyloctadecylchlorosilane<br>dimethyloctadecylmethoxysilane<br>methyloctadecyldichlorosilane<br>methyloctadecyldimethoxysilane<br>octaecyltrichlorosilane<br>octaecyltrimethoxysilane<br>1,3,5,7-tetraoctadecyl-1,3,5,7-tetramethyl-cyclotetrasiloxane |
| Phenyl group | triphenylchlorosilane<br>methyldiphenylchlorosilane<br>dimethylphenylchlorosilane<br>diphenyldichlorosilane<br>methylphenyldichlorosilane<br>phenyltrichlorosilane<br>benzyltrichlorosilane<br>1,3,5,7-tetraphenyl-1,3,5,7-tetramethyl-cyclotetrasiloxane |
| Octyl group | dimethyloctylchlorosilane<br>methyloctyldichlorosilane<br>octyltrichlorosilane<br>1,3,5,7-tetraoctyl-1,3,5,7-tetramethyl-cyclotetrasiloxane |
| n-butyl group | n-butyldimethylchlorosilane<br>n-butylmethyldichlorosilane<br>n-butyltrichlorosilane<br>1,3,5,7-tetra-n-butyl-1,3,5,7-tetramethyl-cyclotetrasiloxane |
| Cyanopropyl group | 3-cyanopropyldimethylchlorosilane<br>3-cyanopropylmethylchlorosilane<br>3-cyanopropyltrichlorosilane |

Among the chemical modifiers listed above, monochlorosilanes and monoalkoxysilanes such as dimethyloctadecylchlorosilane and dimethyloctadecylmethoxysilane may be used, although preferred are dichlorosilanes (e.g., methyloctadecyldichlorosilane), trichlorosilanes (e.g., octadecyltrichlorosilane), dialkoxysilanes (e.g., methyloctadecyldimethoxysilane), trialkoxysilanes (e.g., octadecyltrimethoxysilane), cyclosiloxanes (e.g., 1,3,5,7-tetraoctadecyl-1,3,5,7 tetramethylcyclotetrasiloxane), and polysiloxanes. The reason why these silanes and siloxanes are preferred is associated with the second or end-capping step to be described later in detail, wherein the higher the temperature, the more the end-capping reaction proceeds, and hence, the fewer the silanol groups are left. Undesirably at such higher temperatures, the chemically modifying groups chemically attached to the silica gel tend to separate away. However, the use of di- or trichlorosilanes, di- or trialkoxysilanes, cyclosiloxanes or polysiloxanes as the chemical modifier in the first step can avoid the detachment of chemically modifying groups during the end-capping step. The detachment prevention is greater with these compounds than with monochloro- or monoalkoxysilanes.

Silica gel or porous glass may be reacted with the chemical modifiers by well-known methods under ordinary conditions. For example, silica gel or porous glass is reacted with the chemical modifiers in solvents which do not react with the modifiers and are thermally stable at the reaction temperature, for example, such as toluene for effecting chemical modification. The reaction temperature may be in the range of 0° to 400° C. and the reaction time may be in the range of from about ½ to about 72 hours.

In the second step of the method according to the invention, the chemically modified silica gel or porous glass resulting from the first step is end capped through gas phase reaction in a solventless system. More particularly, the chemically modified silica gel or porous glass is reacted with an end-capping agent in gas phase at a temperature of 250° C. or higher to chemically attach the end-capping agent to the residual silanol groups on the silica gel or porous glass.

More silanol groups are left unreacted at reaction temperatures below 250° C. No upper limit need be imposed on the reaction temperature although the upper limit of 500° C. is generally recommended because at extremely high temperatures, fewer silanol groups are left unreacted, but more of the chemically modifying groups which have been chemically attached to the silica gel or porous glass are detached. Preferably, the reaction temperature ranges from 250° to 450° C., more preferably from 250° to 400° C. The reaction time generally ranges from about 30 minutes to about 96 hours, preferably from about 12 to about 48 hours.

The reaction atmosphere is preferably of an inert gas such as nitrogen, helium, and argon. In general, the end-capping agent is supplied at a concentration of 0.001 to 5 mmol/ml, preferably 0.01 to 1 mmol/ml in the atmosphere although the concentration need not be limited thereto.

The type of the end-capping agent used herein is not particularly limited. A variety of silazanes, silanes, and siloxanes may be used. Preferred are disilazanes of formula (1), hydrogensilanes of formula (2), alkoxysilanes of formula (3), disilanes of formula (4), and siloxanes of formula (5) all shown below.

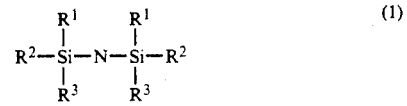

(1)

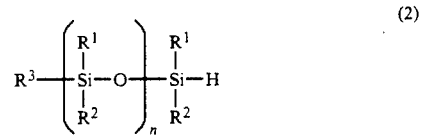

(2)

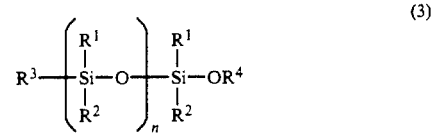

(3)

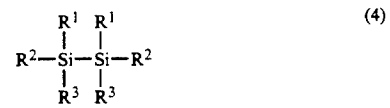

(4)

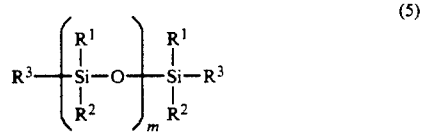

(5)

In the above formulae, $R^1$, $R^2$, $R^3$, and $R^4$ are independently selected from alkyl groups having 1 to 9 carbon atoms, preferably 1 to 3 carbon atoms, letter n is an integer of 0 to 50, and m is an integer of 1 to 50.

Preferred examples include hexamethyldisilazane, pentamethyldisiloxane, diethylmethylsilane, triethylsilane, trimethylmethoxysilane, and hexamethyldisilane.

Preferred end-capping agents are compounds one molecule of which reacts with at least two of the residual silanol groups on the silica gel or porous glass. The end-capping agents of this type are denoted crosslinking end-capping agents. Use of such end-capping agent results in a packing material having a structure in which end-capping agent molecules chemically attach to residual silanol groups around the chemically modifying groups in a bridging manner so that the influence of residual silanol groups is minimized.

The crosslinking end-capping agents include cyclosiloxanes of formula (6), hydrogensiloxanes of formula (7), alkoxysilanes of formula (8), and siloxanes of formula (9) all shown below.

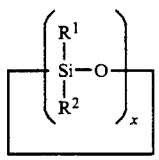
(6)

$R^1$ and $R^2$ are as defined above, and x is an integer of 3 to 10.

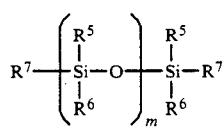
(7)

$R^5$, $R^6$, and $R^7$ independently represent a hydrogen atom or an alkyl group having 1 to 9 carbon atoms, preferably 1 to 3 carbon atoms, and m is as defined above. This compound should have at least two SiH groups, preferably two or three SiH groups.

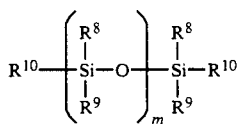
(8)

$R^8$, $R^9$, and $R^{10}$ independently represent an alkoxy group having 1 to 4 carbon atoms or an alkyl group having 1 to 9 carbon atoms, preferably 1 to 3 carbon atoms, and m is as defined above. This compound should have at least two, preferably two or three alkoxy groups directly attached to silicon atoms.

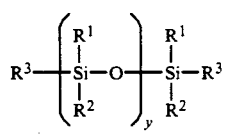
(9)

$R^1$, $R^2$, and $R^3$ are as defined above, and y is an integer of 1 to 100.

Examples of the crosslinking end-capping agent include hexamethylcyclotrisiloxane, octamethylcyclotetrasiloxane, decamethylcyclopentasiloxane, dodecamethylcyclohexasiloxane, 1,1,3,3-tetramethyldisiloxane, 1,1,3,3,5,5-hexamethyl trisiloxane, and 1,3-dimethoxytetramethyldisiloxane, with the hexamethylcyclotrisiloxane being preferred.

In the second step of the present method, end-capping can be completed with a single reaction stage. It is also preferred to carry out end-capping reaction in two or more successive stages because the influence of residual silanol groups can be minimized. Where two stages of end-capping reaction are successively carried out, it is preferred in view of the minimized influence of residual silanol groups that the end-capping agent in the first stage be a crosslinking end-capping agent, especially hexamethylcyclotrisiloxane, and the end-capping agent in the second stage be hexamethyldisilazane.

The method of the invention utilizes a gas phase reaction procedure for end-capping purposes and produces a packing material of silica gel or porous glass having a reduced amount of residual silanol. Due to the reduced residual silanol content, the packing material shows reduced adsorption to basic compounds. A liquid chromatograph column charged with the packing material insures accurate analysis because it is substantially free of such problems as non-elution or adsorption of basic compounds and tailing.

EXAMPLE

Examples of the present invention are given below by way of illustration and not by way of limitation.

EXAMPLES 1–38

Packing materials for use in liquid chromatographs were prepared according to the first and second steps mentioned below.

First Step: Chemical Modification of Silica Gel

Spherical particulate porous silica gel having a pore diameter of about 100 Å and a mean particle size of about 5 μm was reacted with a chemical modifier selected from the monochlorosilanes, dichlorosilanes, and trichlorosilanes shown in Table 2, thereby chemically attaching octadecyl, phenol, n-butyl or 3-cyanopropyl groups to silanol groups on the silica gel surface.

More specifically, 10 grams of the silica gel was dried in vacuum at 120° C. for 6 hours and placed in a flask. To the flask were added 40 ml of dry toluene, 20 millimol (mM) of the chemical modifier, and an equivalent to the chemical modifier of pyridine. With an oil bath, the flask was heated for 16 hours for effecting reaction under toluene reflux. The reaction product was recovered by filtration on a glass filter G-4 and washed with 150 ml of toluene. Thereafter, the reaction product was subjected to either Procedure (1) when the chemical modifier is a monochlorosilane or Procedure (2) when the chemical modifier is a dichlorosilane or trichlorosilane.

Procedure (1)

The product was washed with 150 ml of methanol and then with 100 ml of acetone on the filter and then dried in vacuum at 120° C. for 6 hours.

Procedure (2)

The product was washed with 100 ml of acetonitrile on the filter. A 1/1 mixture of acetonitrile and water was added to the product and agitated for hydrolyzing unreacted chloro groups. The reaction product was recovered by filtration on a glass filter G-4, washed with 100 ml of methanol and then with 100 ml of acetone, and finally dried in vacuum at 120° C. for 6 hours.

Second Step: End-Capping

A container was charged with 3 grams of the chemically modified silica gel resulting from the first step and 2.9 mM or 4.4 mM of an end-capping agent selected from the silanes shown in Tables 3 and 4, purged with nitrogen, and then sealed. The container was placed in a constant temperature tank where it was heated at the temperature for the time shown in Tables 3 and 4. The reaction product was washed with toluene and then with methanol, and finally dried in vacuum at 120° C. for 2 hours.

The product or packing material was subjected to elemental analysis and examined for the influence of residual silanol groups by the following procedures. The results are shown in Tables 3 and 4.

Elemental Analysis

Elemental analysis was made on the packing material both before and after the end-capping step. A change in the carbon content was a measure indicative of the degree of detachment of chemically modifying groups during end-capping. A smaller reduction of carbon content designates that less chemically modifying groups are detached.

Influence of Residual Silanol Groups

A stainless steel column having an inner diameter of 4.6 mm and a length of 15 cm was filled with the packing material. With a mobile phase in the form of 30/70 acetonitrile/water flowing at a flow rate of 1 ml/min. and a UV detector operating at a wavelength of 254 nm, 3 μl of a mixed sample containing 150 μg/ml of pyridine and 1000 μg/ml of phenol was introduced into the column. There was obtained a chromatogram, from which the tailing factor of pyridine and the separation factor α for pyridine and phenol were calculated.

As the influence of residual silanol becomes smaller, pyridine or a basic compound is eluted faster than phenol, with an attendant increase of α value. At the same time, the tailing is reduced, with an attendant reduction of tailing factor. The tailing factor and separation factor α are defined below.

Tailing factor $= W_{0.05}/2f$

Referring to FIG. 1 showing an exemplary waveform, $W_{0.05}$ is a peak width at a height of 1/20 of the peak height from the peak ground, and f is the distance of a forward portion of $W_{0.05}$ which extends from the peak rise starting point to the intersection between a perpendicular line from the peak apex and the abscissa on the chromatogram paper.

Separation factor $\alpha = k2'/k1'$

In the formula, k1' and k2' are capacity factors of solutes 1 and 2, provided that $k2' > k1'$. Capacity factor k' is defined as $$k' = (t_R - t_0)/t_0$$

wherein $t_R$ is a retention time of the solute and $t_0$ is a time for the mobile phase to pass through the column.

TABLE 2

| Example group | Example No. | Chemical modifier in first step |
|---|---|---|
| A | 1~7 | Dimethyloctadecylmonochlorosilane |
| B | 8~12 | Methyloctadecyldichlorosilane |
| C | 13~26 | Octadecyltrichlorosilane |
| D | 27 | Dimethyloctadecylmonochlorosilane |
|   | 28 | Methyloctadecyldichlorosilane |
|   | 29~31 | Octadecyltrichlorosilane |
| E | 32 | Triphenylchlorosilane |
|   | 33 | Dimethylphenylchlorosilane |
| F | 34 | Diphenyldichlorosilane |
|   | 35 | Methylphenyldichlorosilane |
| G | 36 | Phenyltrichlorosilane |
| H | 37 | n-Butyltrichlorosilane |
|   | 38 | 3-Cyanpropyltrichlorosilane |

TABLE 3

| Example No. | End-capping agent | Second step Reaction temp., °C. | Second step Reaction time, Hr | Carbon content change, % | Tailing factor | Separation factor, α |
|---|---|---|---|---|---|---|
| Group A | | | | | | |
| 1 | Hexamethylcyclotrisiloxane | 250 | 24 | +1.0 | — | — |
| 2 | Hexamethylcyclotrisiloxane | 300 | 24 | −0.85 | — | — |
| 3 | Hexamethylcyclotrisiloxane | 350 | 24 | −24.9 | 1.52 | — |
| 4 | Hexamethylcyclotrisiloxane | 370 | 24 | −36.2 | 1.51 | 2.65 |
| 5 | Hexamethyldisilazane | 250 | 24 | +2.0 | 1.85 | 3.48 |
| 6 | Hexamethyldisilazane | 300 | 24 | −8.4 | 1.85 | 3.43 |
| 7 | Hexamethyldisilazane | 350 | 24 | −23.7 | 1.67 | 3.14 |
| Group B | | | | | | |
| 8 | Hexamethylcyclotrisiloxane | 250 | 24 | +1.3 | 1.93 | — |
| 9 | Hexamethylcyclotrisiloxane | 300 | 24 | +4.3 | 1.31 | — |
| 10 | Hexamethylcyclotrisiloxane | 350 | 24 | −1.1 | 1.42 | — |
| 11 | Hexamethylcyclotrisiloxane | 370 | 24 | −10.0 | 1.53 | 2.65 |
| 12 | Hexamethyldisilazane | 350 | 24 | −11.1 | 1.59 | 3.25 |
| Group C | | | | | | |
| 13 | Hexamethylcyclotrisiloxane | 250 | 24 | +4.4 | — | — |
| 14 | Hexamethylcyclo- | 300 | 24 | +6.9 | 1.27 | — |

TABLE 3-continued

| Example No. | Second step End - capping agent | Reaction temp., °C. | Reaction time, Hr | Carbon content change, % | Tailing factor | Separation factor, α |
|---|---|---|---|---|---|---|
| | trisiloxane | | | | | |
| 15 | Hexamethylcyclo-trisiloxane | 350 | 24 | +1.0 | 1.21 | — |
| 16 | Hexamethylcyclo-trisiloxane | 370 | 24 | −5.9 | 1.43 | 2.67 |
| 17 | Hexamethyl-disilazane | 360 | 46 | −1.8 | 2.31 | 2.69 |
| 18 | Octamethylcyclo-tetrasiloxane | 360 | 46 | −4.7 | 1.73 | — |
| 19 | 1,1,3,3-Tetra-methyldisiloxane | 340 | 46 | +5.4 | 2.08 | — |
| 20 | 1,1,3,3-Tetra-methyldisiloxane | 360 | 46 | +0.37 | 1.29 | 2.86 |
| 21 | Pentamethyl-disiloxane | 340 | 46 | +1.6 | 1.68 | — |
| 22 | Diethylmethyl-silane | 340 | 46 | +3.6 | 1.40 | — |
| 23 | Diethylmethyl-silane | 360 | 46 | +3.1 | 1.26 | — |
| 24 | Trimethyl-methoxysilane | 340 | 46 | +1.2 | 1.63 | — |
| 25 | Hexamethyl-disilane | 340 | 46 | +2.0 | 1.63 | — |
| 26 | Hexamethyl-disilane | 360 | 46 | −3.8 | 1.32 | — |

TABLE 4

| Example No. | Second step End - capping agent | | Reaction temp., °C. | Reaction time, Hr | Carbon content change, % | Tailing factor | Separation factor, α |
|---|---|---|---|---|---|---|---|
| | Group D | | | | | | |
| 27 | 1st | Hexamethyl-cyclotrisiloxane | 350 | 24 | −3.3 | 1.35 | 3.65 |
| | 2nd | Hexamethyl-disilazane | | | | | |
| 28 | 1st | Hexamethyl-cyclotrisiloxane | | | −3.0 | 1.38 | 3.71 |
| | 2nd | Hexamethyl-disilazane | | | | | |
| 29 | 1st | Hexamethyl-cyclotrisiloxane | | | +3.7 | 1.33 | 3.72 |
| | 2nd | Hexamethyl-disilazane | | | | | |
| 30 | 1st | Hexamethyl-cyclotrisiloxane | 340 | 42 | +9.8 | 1.44 | 2.23 |
| | 2nd | Hexamethyl-cyclotrisiloxane | | | | | |
| 31 | 1st | Hexamethyl-cyclotrisiloxane | | | +2.4 | 1.12 | 2.96 |
| | 2nd | Diethylmethyl-silane | | | | | |
| | Group E | | | | | | |
| 32 | Hexamethyl-cyclotrisiloxane | | 350 | 24 | −31.9 | 2.21 | 2.46 |
| 33 | Hexamethyl-cyclotrisiloxane | | | | −24.9 | 2.01 | 2.53 |
| | Group F | | | | | | |
| 34 | Hexamethyl-cyclotrisiloxane | | 350 | 24 | +7.5 | 2.13 | 2.20 |
| 35 | Hexamethyl-cyclotrisiloxane | | | | +9.5 | 1.88 | 2.34 |
| | Group G | | | | | | |
| 36 | Hexamethyl-cyclotrisiloxane | | 340 | 24 | +38.0 | 1.91 | 2.36 |
| | Group H | | | | | | |
| 37 | Hexamethyl-cyclotrisiloxane | | 340 | 24 | +60.2 | 1.17 | 2.67 |
| 38 | Hexamethyl-cyclotrisiloxane | | | | +59.5 | 1.16 | 2.98 |

In Tables 2 to 4, the examples are classified into groups A to H according to the following criterion.

A: The chemical modifiers are octadecylmonochlorosilanes.

B: The chemical modifiers are octadecyldichlorosilanes.

C: The chemical modifier is octadecyltrichlorosilane.

D: Two stages of end-capping are used.

E: The chemical modifiers are phenylmonochlorosilanes.

F: The chemical modifiers are phenyldichlorosilanes.

G: The chemical modifier is phenyltrichlorosilane.

H: The chemical modifiers are other trichlorosilanes.

To compare the performance of the packing materials of Examples 1–38 with that of conventional packing materials, four commercially available typical ODS columns (Comparative Examples 1–4) were used to analyze the same pyridine/phenol sample as in Examples, determining a tailing factor and a separation factor $\alpha$. The results are shown in Table 5.

TABLE 5

|  | Tailing factor | Separation factor $\alpha$ |
| --- | --- | --- |
| Comparative Example 1 | 2.55 | 2.39 |
| Comparative Example 2 | 3.82 | 2.48 |
| Comparative Example 3 | 3.09 | 1.53 |
| Comparative Example 4 | 2.52 | 2.61 |

It is to be noted the ODS columns of Comparative Examples 1–4 are available from manufacturers D, Y, N, and S (initial only), respectively.

A pyridine/phenol sample was analyzed by liquid chromatography using the packing materials of Examples 4, 11, 16, 29, 36, 37, and 38 and Comparative Examples 1 to 4. The resulting chromatograms are shown in FIGS. 2 to 12.

The following observations are derived from the results.

(1) The columns (Groups A to D) of Examples had a higher separation factor $\alpha$ of pyridine and phenol and a lower tailing factor of pyridine than the commercial ODS columns of Comparative Examples 1 to 4. This suggests that the end-capping in gas phase at the specific temperature leads to the synthesis of packing materials having reduced influence of residual silanol groups.

(2) As compared with the chemical modification with monochlorosilanes, the chemical modification of silica gel with dichlorosilanes or trichlorosilanes is successful in controlling the detachment of chemically modifying groups from the silica gel during the gas phase end-capping and thus synthesizing packing materials having higher carbon contents. The influence of residual silanol groups is approximately equal among all the chlorosilanes used.

(3) End-capping with the silanes capable of reacting with two or more silanol groups such as, for example, hexamethylcyclotrisiloxane, octamethylcyclotetrasiloxane, and tetramethyldisiloxane results in the synthesis of packing materials having minimized influence of residual silanol groups. It is presumed that end-capping silane molecules chemically attach to residual silanol groups on the silica gel surface around the chemically modifying groups in a bridging manner, thereby effectively covering the silica gel surface.

(4) The two stage end-capping, more specifically end-capping of the silica gel first with hexamethylcyclotrisiloxane and then with hexamethyldisilazane can further reduce the influence of residual silanol groups as compared with the single stage end-capping. However, no significant effect was observed when hexamethylcyclotrisiloxane or diethylmethylsilane was used for the second stage of end-capping.

Equivalent results were obtained when porous glass was used instead of the silica gel.

Although some preferred embodiments have been described, many modifications and variations may be made thereto in the light of the above teachings. It is therefore to be understood that within the scope of the appended claims, the invention may be practiced otherwise than as specifically described.

we claim:

1. A method for preparing a packing material for use in a liquid chromatograph, comprising the steps of:
   reacting silica gel or porous glass having silanol groups on the surface thereof with a chemical modifier to chemically attach the chemical modifier to silanol groups on the silica gel or porous glass, and
   reacting the chemically modified silica gel or porous glass with an end-capping agent in gas phase at a temperature of 250° C. or higher to chemically attach the end-capping agent to the residual silanol groups on the silica gel or porous glass.

2. The method of claim 1 wherein the chemical modifier is selected from the group consisting of a dichlorosilane, a trichlorosilane, a dialkoxysilane, a trialkoxysilane, a cyclosiloxane, and mixtures thereof, all the silanes and siloxanes having a chemically modifying group selected from the group consisting of an alkyl group having 1 to 50 carbon atoms, an aryl group having 6 to 50 carbon atoms, and a substituted alkyl group whose alkyl group has 1 to 50 carbon atoms.

3. The method of claim 1 wherein the end-capping agent is a compound one molecule of which reacts with at least two of the residual silanol groups on the silica gel or porous glass.

4. The method of claim 1 wherein the step of reacting the chemically modified silica gel or porous glass with an end-capping agent includes reacting the chemically modified silica gel or porous glass with a compound one molecule of which reacts with at least two of the residual silanol groups on the silica gel or porous glass and then with hexamethyldisilazane.

5. The method of claim 1 wherein the gas phase reaction temperature ranges from 250° to 450° C.

6. The method of claim 1 wherein the gas phase reaction temperature ranges from 250°–450° C.

7. The method of claim 1 wherein the gas phase reaction time is between 30 minutes and 96 hours.

8. The method of claim 1 wherein the gas phase reaction atmosphere is an inert gas selected from the group consisting of nitrogen, helium and argon.

9. The method of claim 5 wherein the gas phase reaction atmosphere is an inert gas selected from the group consisting of nitrogen, helium and argon.

10. The method of claim 7 wherein the gas phase reaction is carried out in an inert atmosphere selected from the group of gases consisting of nitrogen, helium and argon.

11. The method of claim 5, wherein the gas phase reaction is carried out for a period of 30 minutes to 96 hours in an atmosphere selected from the group consisting of nitrogen, helium, and argon.

12. The method of claim 1 wherein said capping agent is supplied at a concentration of 0.001 to 5 mmol/ml.

13. The method of claim 11, wherein said capping agent is supplied at a concentration of 0.001 to 5 mmol/ml.

14. The method of claim 2, wherein said capping reaction is carried out at a temperature of 250°–400° C., for a time period of 30 minutes to 96 hours, in an inert atmosphere selected from the group consisting of gases nitrogen, helium, and argon, and said capping agent is delivered at a concentration of 0.001 to 5 mmol/ml.

15. The method of claim 3, wherein the reaction is carried out at a temperature of 250°–400° C., for a time of 30 minutes to 96 hours, in an inert atmosphere consisting of one of the gases selected from the group consisting of nitrogen, helium, and argon, and said capping agent is delivered at a concentration of 0.001 to 5 mmol/ml.

* * * * *